(12) United States Patent
Joussemet et al.

(10) Patent No.: US 7,774,180 B2
(45) Date of Patent: Aug. 10, 2010

(54) METHOD AND SYSTEM FOR IDENTIFYING PROXIMITY AREAS BETWEEN SEVERAL DIGITALLY SIMULATED GEOMETRICAL OBJECTS

(75) Inventors: Lionnel Joussemet, Bourg la Reine (FR); Flavien Maingreaud, Velizy (FR)

(73) Assignees: Commissariat a l'Energie Atomique et Aux Energies Alternatives, Paris (FR); Hapton, Soulges sur Ouette (FR)

(*) Notice: Subject to any disclaimer, the term of this patent is extended or adjusted under 35 U.S.C. 154(b) by 422 days.

(21) Appl. No.: 11/658,125

(22) PCT Filed: Jul. 20, 2005

(86) PCT No.: PCT/FR2005/050597
§ 371 (c)(1),
(2), (4) Date: Feb. 27, 2008

(87) PCT Pub. No.: WO2006/018570
PCT Pub. Date: Feb. 23, 2006

(65) Prior Publication Data
US 2008/0319718 A1    Dec. 25, 2008

(30) Foreign Application Priority Data
Jul. 22, 2004    (FR) .................... 04 08114

(51) Int. Cl.
*G06F 9/455*    (2006.01)
(52) U.S. Cl. .......................................... 703/6
(58) Field of Classification Search ............ 703/6, 703/7, 1, 2; 702/150; 356/625; 345/629, 345/420; 700/246; 382/190
See application file for complete search history.

(56) References Cited

U.S. PATENT DOCUMENTS 6,331,861 B1 * 12/2001 Gever et al. ................ 345/629

(Continued)

OTHER PUBLICATIONS

Beveridge et al., "Matching horizon features using Messy genetic algorithm", Computer methods in Applied Mechanics and Engineering, Mar. 1999.*

(Continued)

*Primary Examiner*—Paul L Rodriguez
*Assistant Examiner*—Kandasamy Thangavelu
(74) *Attorney, Agent, or Firm*—Weingarten, Schurgin, Gagnebin & Lebovici LLP

(57) ABSTRACT

The system for identifying zones of proximity between a plurality of digitally simulated objects comprises:
(a) first memory (111) for storing data describing the geometry of the objects, (b) an initialization module (120) for creating a population of pions, and (c) a central processor unit (140) comprising at least: (c1) a unit (141) for selecting a percentage of the population of pions to be subjected to combats in pairs, (c2) a comparison and calculation unit (142) for evaluating the quality of each of the pions in each pair of pions subjected to a combat, (c3) a marking unit (143) for identifying in each session of the tournament which of the pions of a pair of pions subjected to a combat has won or lost, (c4) an iteration unit (144) for causing the pions that have been subjected to at least one combat to evolve, in association with at least one operator for producing an exploratory mutation, and at least one redefinition operator, and (c5) an extraction module (145) for retaining only the best pions from the population for determining the zones of proximity between at least two objects.

24 Claims, 9 Drawing Sheets

U.S. PATENT DOCUMENTS

Figure 1:
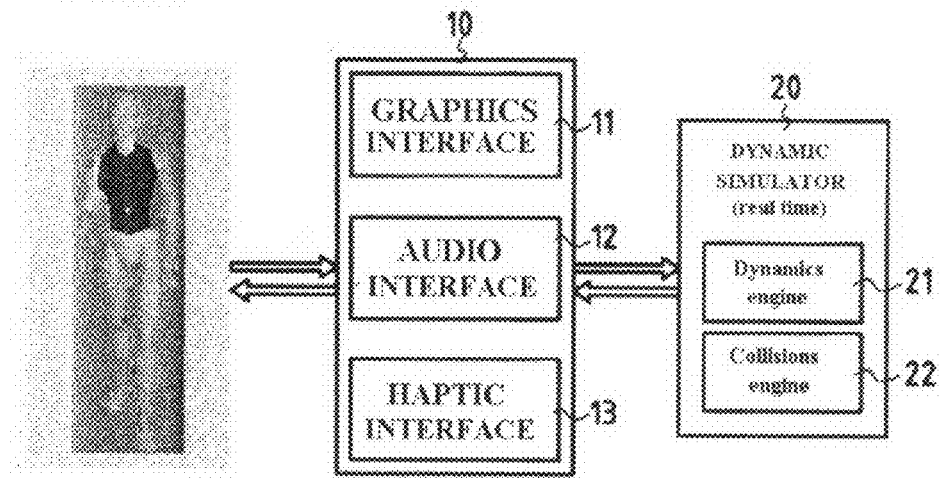

| | | | |
|---|---|---|---|
| 7,236,167 B2* | 6/2007 | Lee et al. | 345/420 |
| 2002/0013675 A1* | 1/2002 | Knoll et al. | 702/150 |
| 2003/0128876 A1* | 7/2003 | Yamaguchi | 382/190 |
| 2004/0017575 A1* | 1/2004 | Balasubramanian et al. | 356/625 |
| 2004/0044441 A1* | 3/2004 | Gupta et al. | 700/246 |

OTHER PUBLICATIONS

Martin et al., "Aero-thermal analysis and optimization of internally cooled turbine airfoils", XIII International symposium on airbreathing engines, Sep. 1997.*

Guha, P., "Automated visual inspection of steel surface, texture segmentation and development of perceptual similarity measure", Indian Institute of Technology, 2001.*

Lacy, M.: "An Introduction to Genetic Algorithms in Java" 'Online! Mar. 1, 2001, pp. 1-6; retrieved from the Internet: URL:http://syscon.com/story/?storyid=36224&de-1> retrieved on Apr. 12, 2005.

Elshamli A., et al: "Genetic algorithm for dynamic path planning," Electrical and Computer Engineering, 2004. Canadian Conference on Niagara Falls, Ont., Canada May 2-5, 2004, Piscataway, NJ, USA, IEEE, US, May 2, 2004, pp. 677-680 vol. 2.

Toogood R., et al.: "Robot path planning using genetic algorithms," Systems, Man and Cybernetics, 1995. Intelligent Systems for the 21$^{st}$ Century., IEEE International Conference on Vancouver, BC, Canada, Oct. 22-25, 1995, New York, NY, USA, IEEE, US, vol. 1, Oct. 22, 1995, pp. 489-494.

Gilbert et al., "A fast procedure for computing the distance between complex objects in three-dimensional space", IEEE Journal of Robotics and Automation, IEEE vol. 4, No. 2, Apr. 1988, pp. 193-203.

Lin et al., "A fast algorithm for incremental distance calculation", IEEE International Conference on Robotics and Automation, 1991, 7 pages.

Dobkin et al., "Determining the separation of preprocessed polyhedra", Automata, Languages and Programming 17$^{th}$ International Colloquium Proceedings; 1990, pp. 400-413.

Abdel-Malek et al., "On swept volume formulations: implicit surfaces", Computer aided design 33 2001, pp. 113-121.

Abdel-Malek et al., "Swept volumes: void and boundary identification", Computer aided design vol. 30 No. 13, 1998, pp. 1009-1018.

Redon et al., "Interactive and continuous collision detection for avatars in virtual environments", IEEE Virtual Reality, Mar. 27-31, 2004, pp. 117-283.

* cited by examiner

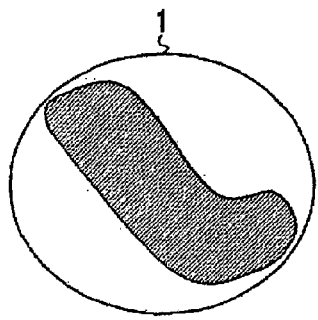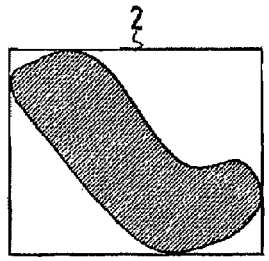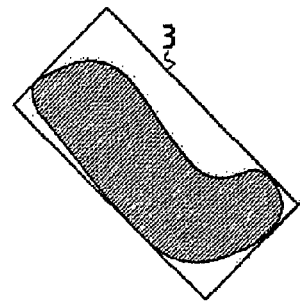
FIG.4A     FIG.4B     FIG.4C
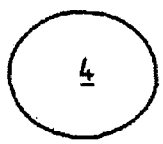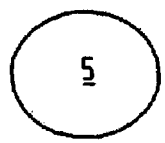 FIG.5A
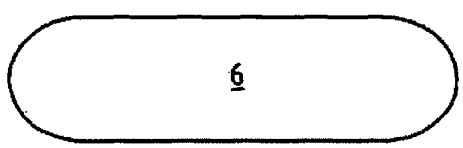
FIG.5B
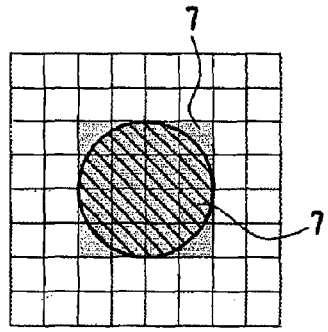
FIG.6
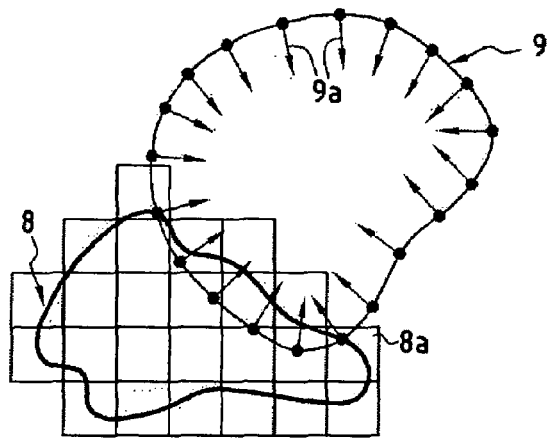
FIG.7A
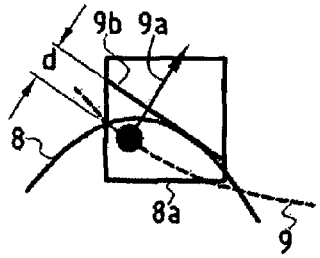
FIG.7B

METHOD AND SYSTEM FOR IDENTIFYING PROXIMITY AREAS BETWEEN SEVERAL DIGITALLY SIMULATED GEOMETRICAL OBJECTS

This application is a §371 national phase filing of PCT/FR2005/050597 filed Jul. 20, 2005, and claims priority to French application No. 04 08114 filed Jul. 22, 2004.

The present invention relates to a method and to a system for identifying zones of proximity between several digitally simulated objects and for evaluating distances between them. An object thus consists of a geometry within a digital environment.

For example, the interactive simulation of the real world within a digital environment is known as "virtual reality" (VR).

A virtual reality platform (FIG. 1) comprises interfaces 10 between the virtual environment and the operator or operators participating in the simulation. There are several types of interface, each being intended to stimulate one of the senses of the operator or operators. Thus a visual interface 11, an auditory interface 12, and a haptic interface 13 may be used in a VR platform, for example.

A VR platform further comprises a dynamic simulator 20 serving to govern in real time the evolution of the components of the virtual environment in accordance with the laws of physics and their interactions. These interactions may be bilateral (mechanical connections) or unilateral (collision).

A dynamic simulator 20 is similar to a physical engine serving to govern the evolution of a virtual world consisting of objects having dynamic and geometrical properties. This task can be divided into two subtasks: managing the dynamics of the virtual world (dynamics engine 21) and managing collisions that occur within it (collisions engine 22).

Managing the dynamics of the virtual world governs the evolution of the individual objects contained in the virtual world in accordance with the laws of physics.

Figure 2:
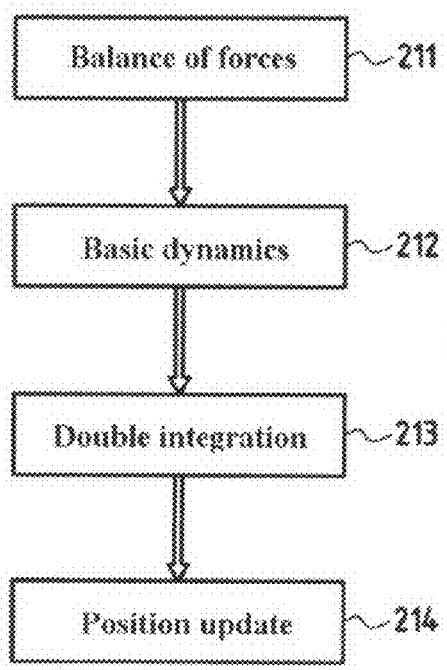

FIG. 2 is a diagram of the operation of a dynamics engine 21 for a single object.

The first step 211 establishes a balance of the forces applied to the virtual object. These forces to which the object is subjected may have various origins: gravity, articular stresses (also known as bilateral connections), manipulation by the operator. Their accumulation yields a static force torsor. The linear and angular accelerations of the object are determined during the second step 212 by application of basic dynamics. The new position and orientation are then directly determined by double integration during the third step 213. It is interesting to note that evolving in discrete time imposes approximation of the integration. Several methods may be envisaged for this (Euler, Tustin, Runge-Kutta, etc.). The last step 214 simply consists in updating the position and the orientation of the object concerned.

The collisions engine 22 performs a task that may be divided into two stages: detection of collisions and generation of contact forces.

Collision detection may be effected by a number of techniques as a function of the type of geometry used and the expected performance. In the context of discrete methods, which constitute the great majority of the techniques used, this first stage consists in detecting instantaneous interpenetration of the various pairs of objects. In contrast, continuous methods detect the exact time of the first contact between objects.

Whichever method is used, this first stage proves to be the most burdensome of the tasks to be effected by the dynamic simulator. In fact, the quantity of calculations to be effected in the context of collision detection is linked directly to the nature of the objects evolving in the virtual world, particularly in terms of geometrical complexities.

After this first stage of detecting collisions, the forces resulting from the collisions between the pairs of solids concerned remain to be determined. These forces are generally resolved into a normal reaction force and a tangential friction force. It is therefore necessary to model these collisions. Three methods are primarily used for this: the penalty method, the pulse method, and the constraint method.

In the context of dynamic simulations that operate in real time, the management of unilateral constraints (collisions), whether in terms of detecting collisions or calculating the contact forces, generates a limitation on the geometrical complexity of the components of the virtual world (nature, number and type of elementary entities). The nature of the object consists of all of its properties of convexity (convex/concave) and rigidity (infinitely rigid/deformable). The elementary entities used for the geometrical definition of an object may be of several types: meshes (triangles, quads), voxels, points, analytical surfaces. The main techniques for detecting collisions between dynamic objects are described below.

Zones liable to come into collision are located by standard collision detection techniques, and more particularly by optimizations thereof. Accordingly, three major strategies that can address this requirement emerge from the scientific literature: calculating the minimum distance between objects, hierarchies of bounding volumes, and consideration of the volume swept out during the movement.

The first technique therefore consists in calculating the instantaneous minimum distance between two objects. E1 and E2 of polyhedral type and thus discovering which geometrical elements e1, e2 are closest together (see FIG. 3).

A number of approaches to obtaining this minimum distance and the geometrical elements concerned have been adopted. Most of those techniques consider convex objects. They could nevertheless prove useful in the context of simulations involving concave objects if they are subdivided into convex elements. A first method of determining this minimum distance and the elements concerned was introduced by Gilbert, Johnson and Keerthi. That method, based on the Minkowsky difference and convex optimization, determines the distance between two convex envelopes of two sets of points E1 and E2 and for the worst-case scenario in terms of complexity, $o((n+m)^2)$, n and m being the number of points contained in E1 and E2, respectively.

It is nevertheless possible to optimize that method on the basis of the results obtained during previous iterations, and thereby reduce the complexity to $o(n)$. That method does not take into account the nature of the objects concerned and the evolution of their geometries. It is therefore used in methods involving objects other than rigid and convex objects. Lin and Canny introduce a calculation method of determining two undeformable convex meshes from the two points that are closest together, and to do so in linear time. That method is based on the concept of spatial and temporal consistency. Since the virtual world is evolving in accordance with a dynamic model, the displacement of an object during a time increment is infinitesimal, and so it may be expected that, in a given cycle, the closest-together points lie in the vicinity of the points that were closest together in the previous cycle. Since that method assumes a "continuous" change of the zones of interest over the meshes concerned, it can be optimized via a multi-resolution approach for accelerating the "displacement of the calculation" within the mesh, like that proposed by Dobkin and Kirkpatrick.

A second approach taking into account a hierarchy of bounding volumes consists in partitioning the spaces occupied by the objects constituting the scene. Thus each object is approximated by a bounding volume, itself divided into a tree of subvolumes (generally of similar topology to the "root" bounding volume). The strategy consists in spatially locating the zones liable to interpenetrate. In practice, there is a test for the presence of overlapping of bounding volumes of distinct objects, after which, assuming an overlap, a similar recursive test is carried out at the level of the subvolumes that they contain. That strategy avoids a multitude of irrelevant tests and is very widely used in existing physics engines. However, there may be a very large number of such overlap tests in some configurations (plane/plane, for example), thereby compromising the performance of the simulation. Moreover, updating those volumes (movement, deformation) may prove costly.

Several types of geometry may be used in the context of this segmentation of space. Those most commonly used are spheres 1, isothetic bounding boxes 2 (AABB), and oriented bounding boxes 3 (OBB) (see FIGS. 4A, 4B, 4C).

Each of those types of bounding volume is more or less suitable as a function of the geometry concerned and the expected level of performance. Thus the main advantage of bounding spheres is simple overlap tests. In fact, testing the overlapping of two spheres is limited to comparing the distance between their centers and the sum of their respective radii. However, spheres generally give a suboptimum approximation of the geometry concerned, compared to OBBs, for example, which, despite much more extensive overlap tests (separator axes theorem), limit the execution of irrelevant tests through a minimum bounded volume.

Architecturally, the hierarchies of bounding volumes take the form of trees, often binary trees in order to optimize scanning them. There are also octrees (8 branches/node) and quadtrees (4 branches/node, better suited to 2D geometries).

The volume swept out by a moving solid during a time period corresponds to the union of the zones of space that it has occupied during that period. That geometrical tool has several fields of application: working space evaluation in robotics, geometrical modeling in CAD. The volume swept out by a sphere during a movement in translation is shown by way of example in FIGS. 5A and 5B, which respectively show the initial position 4 and the final position 5 of the object and the corresponding volume 6 swept out.

Considering the dynamics and the geometry of the rigid objects that evolve within the simulation at a time to, it is feasible to evaluate the volumes that they are liable to sweep out with a horizon $t_n$, n>0, and thus to anticipate their interactions by determining the intersections between their respective swept volumes.

Several methods are described in the literature. The many works of K. Abdel-Malek et al. may be mentioned, for example. One particularly interesting method is also described by Y. J. Kim et al. That method rapidly and robustly identifies the volumes swept out by a polyhedron of relatively great complexity (thousands of facets). In addition to a sophisticated algorithm, it uses hardware enabling it to achieve a very high level of performance usable in the context of a real-time simulation.

Voxels are sometimes used for a discrete definition of any geometry. The theory is to identify and bound the zones of the space occupied by the material using cubes of sizes that vary as a function of the expected degree of resolution (see FIG. 6). The bounding volume and swept volume hierarchy techniques described above can also be applied in the context of optimizing that type of voxel-based approach.

Mention may be made in particular of a technique based on hybrid discretization using voxels ("voxmap" technique) and the association of clouds of points (or "point shells") and normals. This technique is shown in FIGS. 7A and 7B.

FIG. 7A shows a first original object 8 represented in the form of voxels 8a and a second original object 9 represented in the form of a cloud of points and normals 9a.

FIG. 7B shows in detail an interaction between a voxel 8a of a static surface of the object 8 and the cloud of points of the object 9 with the plane 9b tangential to the static surface and the force vector 9a along the normal to the cloud of points of the object 9.

This hybrid discretization technique requires a relatively long precomputation stage but enables complex geometrical data to be managed.

In an analytical approach, two other types of model include implicit surfaces and parametric surfaces. The former use implicit functions that define shapes in space. The implicit surfaces are the set of points for which f(x,y,z)=0, the interior of the model being the points for which f(x,y,z)<0.

For those two modeling methods, solving collision problems therefore comes down to manipulating those functions. Those types of geometrical definition are very little used. Complex objects of any kind (not resulting from primitives) in fact prove to be very difficult to represent in that way, in particular for projecting zones (discontinuity), which are very common in mechanical components, for example.

Once the zones of interpenetration have been identified, it remains to determine the contact forces, in other words the "repulsion" forces that will return the interpenetrated objects to a simple state of contact. Three methods for doing this emerge from the scientific literature: the constraint method, the pulse method, and the penalty method.

The constraint method consists in taking explicit account of the constraints of non-interpenetration at the level of the equations of movements specific to each of the objects. The constraint is expressed as follows:

$$p(t)=f(\text{force})$$

$$C(p(t))\geq 0$$

in which the first equation characterizes the movement of each object as a function of the forces that are applied to it and the second equation characterizes the non-interpenetration constraints.

That method is particularly interesting in the absence of friction and when collisions are not very frequent (collision calculation, i.e. determining C(p(t)), is costly). It has the advantage of having no adverse effects of the stability of the overall system.

The pulse method is a dynamic approach that treats the interaction between two rigid objects as an impact. The collision is therefore considered as a quasi-instantaneous event generating a high force (called a pulse) on the objects concerned. The following relationship therefore applies to the speeds before and after impact:

$$v_o = -ev_i$$

where e is called the coefficient of restitution (e=0: elastic collision, e=1: plastic collision). The Poisson hypothesis can be used to calculate e:

$$e = \frac{P_r}{P_c}$$

If two objects are sufficiently close, the pulse is calculated to separate them in a single iteration. The condition that the objects concerned must have a ballistic trajectory is often applied in order to optimize the calculations.

The penalty method manages the repulsion forces between rigid or deformable objects. It consists in applying to the objects 14, 15 in collision a force proportional to the depth of interpenetration (the term "stiffness" is used). The repulsion "mechanism" is therefore often treated as a system 16 of proportional derivative type (see FIG. 8). That method requires a knowledge of the penetration vector (which may prove costly) and often causes instabilities (particularly with multipoint collisions).

It emerges from the above that evaluating distances and identifying zones of proximity, and where applicable detecting collisions, between geometrical objects evolving within a digital environment is clearly an essential step in a large number of disciplines, such as virtual reality or scenarios for the movements of robotic systems, for example.

Nevertheless, and in particular because of their cost in terms of computation time, the various methods used until now often cannot be used in the context of simulations involving complex geometries and requiring high levels of performance.

The present invention aims to remedy the drawbacks of the prior art and to address most of the recurrent problems in evaluating distances or identifying zones of proximity, and in particular in detecting collisions, by providing solutions with reduced computation times compatible with real-time applications and offering a high level of performance and simplicity of implementation, even if the interacting objects have complex geometries or different natures or qualities.

According to the invention, the above objects are achieved by a method of identifying zones of proximity between at least first and second digitally simulated objects, the method being characterized in that it comprises the following steps:

(a) providing data describing the geometry of each of the first and second digitally simulated objects and storing this data in memory, (b) creating a population consisting of a set of N individuals called pions each defined by first and second nucleons themselves defined as points belonging to the respective geometries of each of the first and second objects, (c) organizing sessions of a tournament involving the N pions of the created population, during each of which sessions a percentage of the population is subject to combats during which, for each pair of pions subjected to a combat, and as a function of an evaluation of quality defined on the basis of an aptitude criterion, it is evaluated which one has won and which one has lost, and the winner and the loser are identified by a mark that is different after each session of the tournament, (d) after the tournament, performing: an exploratory mutation of pions that lost during a first session; a replacement of pions that lost during a second session, by crossing randomly chosen pions; and a random redefinition of pions that lost during a third session, (e) considering only the population of the winners of the combats for processing the pions to be used to determine zones of proximity between the first and second objects, (f) executing steps (c), (d) and (e) again repetitively, and (g) extracting geometrical information on demand from an updated configuration of the population of pions, during the repetitive execution.

During the step of extracting geometrical information, the distances between the identified zones of proximity may be evaluated.

The data for identifying zones of space describing the geometry of at least one of the first and second digitally simulated objects may comprise polyhedral representations, voxel representations, representations by means of parameterized surfaces, or clouds of points.

According to one particular feature, the aptitude criterion for evaluating the quality of a pion consists in measuring the distance separating the first and second nucleons defining that pion, the quality of the pion being inversely proportional to the measured distance. This distance measurement may take into account the square of the distance between the first and second nucleons defining the pion, for example.

The method according to the invention may further comprise, after the step (a) of providing data describing the geometry of each of the first and second digitally simulated objects, the following steps:

(a1) creating a connectivity map containing information defining the properties of adjacency between geometrical elements within the first and second objects and storing the information of this connectivity map in memory, (a2) creating a proximity map containing information defining the proximity properties between the first and second objects and storing the information of this proximity map in memory.

Mutating the pions that lost during a session of the tournament, to generate exploratory mutations for the pions that lost, advantageously consists in moving the first and second nucleons constituting a pion on the surface of the first and second objects to which the first and second nucleons respectively belong.

In one particular implementation, when mutating a pion that lost during a session of the tournament, to generate exploratory mutations for the pions that lost, at least one of the first and second nucleons constituting that pion and belonging to one of the first and second objects represented in polyhedral form is subjected to a succession of discrete facet center to facet center movements, considering the information defining the adjacency properties stored in memory.

In another particular implementation, when mutating a pion that won during the tournament, at least one of the first and second nucleons constituting that pion and belonging to one of the first and second objects represented in a polyhedral form is subjected to a movement on the same facet on a disk having for its center the initial position of that point and for its radius a maximum displacement amplitude that depends on the area of the facet on which the displacement is effected.

In a further particular implementation, when mutating a pion that won during the tournament, at least one of the first and second nucleons constituting that pion and belonging to one of the first and second objects represented in a polyhedral form is subjected to a movement in "wormhole" form from one vertex of one facet to a nearby vertex of another facet that is not necessarily connected, considering the information defining the proximity properties stored in memory.

In a further particular implementation, when mutating a pion that won during the tournament, the first and second nucleons constituting that pion and respectively belonging to the first and second objects each represented in a polyhedral form with triangular facets are positioned so that they delimit an edge defining the minimum distance between the two triangular facets to which these first and second nucleons respectively belong.

During a session of the tournament for generating replacements for the pions that lost, when replacing a pion that lost by crossing randomly chosen pions, so as to define the new pion resulting from crossing first and second randomly chosen pions, it is considered that the new pion consists of the first nucleon of the first randomly chosen pion and the second nucleon of the second randomly chosen pion.

More generally, the invention provides a method applied to a set of P digitally simulated objects with P≧2, the method being characterized in that it comprises the following steps:
(a) providing data describing the geometry of each of the P graphically simulated objects,
(b) creating a population consisting of a set of N individuals called pions each defined by first and second nucleons, themselves defined as points belonging to the respective geometries of one of the P objects and another of the P objects,
(c) organizing sessions of a tournament involving the N pions of the created population, during each of which sessions a percentage of the population is subject to combats during which, for each pair of pions subjected to a combat, and as a function of an evaluation of quality defined on the basis of an aptitude criterion, it is evaluated which one has won and which one has lost, and the winner and the loser are identified by a mark that is different after each session of the tournament,
(d) after the tournament, performing: an exploratory mutation of pions that lost during a first session, a replacement of pions that lost during a second session, by crossing randomly chosen pions; and a random redefinition of pions that lost during a third session,
(e) considering only the population of the winners of the combats for processing the pions to be used to determine zones of proximity between two of the P digitally simulated objects,
(f) executing steps (c), (d), and (e) again repetitively, and
(g) extracting geometrical information on demand from an updated configuration of the population of pions, during the repetitive execution.

If the data for identifying zones of space describing the geometry of the P digital simulated objects comprise polyhedral representations, the method advantageously further comprises, after step (a) of providing data describing the geometry of each of the P digitally simulated objects, the following steps:
(a1) creating a connectivity map containing information defining the properties of adjacency between geometrical elements within each of the P objects and storing the information of this connectivity map in memory,
(a2) creating a proximity map containing information defining the properties of within each of the P objects and storing the information of this proximity map in memory.

The invention also provides a system for identifying zones of proximity between a number P of digitally simulated objects with P≧2, the system being characterized in that it comprises:
(a) first memory means for storing data describing the geometry of each of the P objects,
(b) an initialization module for creating a population consisting of a set of N individuals called pions each defined by first and second nucleons, themselves defined as points respectively belonging to the geometries of one of the P objects and another of the P objects,
(c) a central processor unit comprising at least:
(c1) means for selecting a percentage of the population of the N pions to be subjected to combats two by two during a session of a tournament,
(c2) comparison and calculation means for evaluating during a session of a tournament, for each pair of pions subjected to a combat, the quality of each of the pions of the pair of pions on the basis of an aptitude criterion,
(c3) marking means for identifying in each session of the tournament which of the pions of a pair of pions subjected to a combat won and which of the pions of said pair of pions subjected to a combat lost,
(c4) iteration means for producing an evolution of the pions that have been subjected to at least one combat, the iteration means being associated at least with an operator for exploratory mutation of pions that lost during a first session of the tournament, an operator for replacement of pions that lost during a second session of the tournament by crossing pions selected randomly, and an operator for redefinition of pions that lost during a third session of the tournament, and
(c5) an extraction module for retaining for the determination of the zones of proximity between at least two of the P objects only the best pions from the population as a function of the aptitude criterion.

The system may further comprise:
(a1) second memory means for storing information representing a connectivity map and defining properties of adjacency between geometrical elements within each of the P objects,
(a2) third memory means for storing information representing a proximity map and defining proximity properties within each of the P objects.

The central processor unit may comprise a set of computation units operating in parallel.

The method and the system according to the invention are therefore founded on an evolutionary process based on a stochastic approach. This evolutionary process deals with populations of individuals defined by real components and not merely defined in binary fashion.

Figure 3:
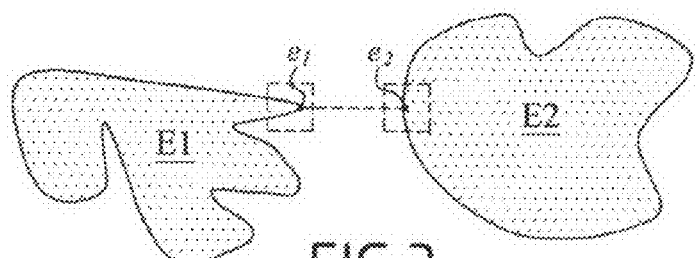
Figure 8:
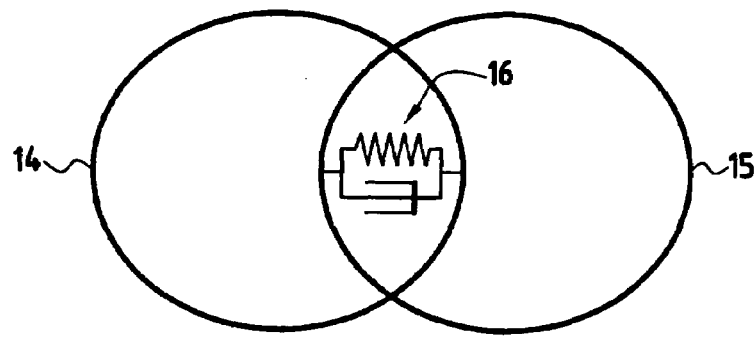
Figure 9:
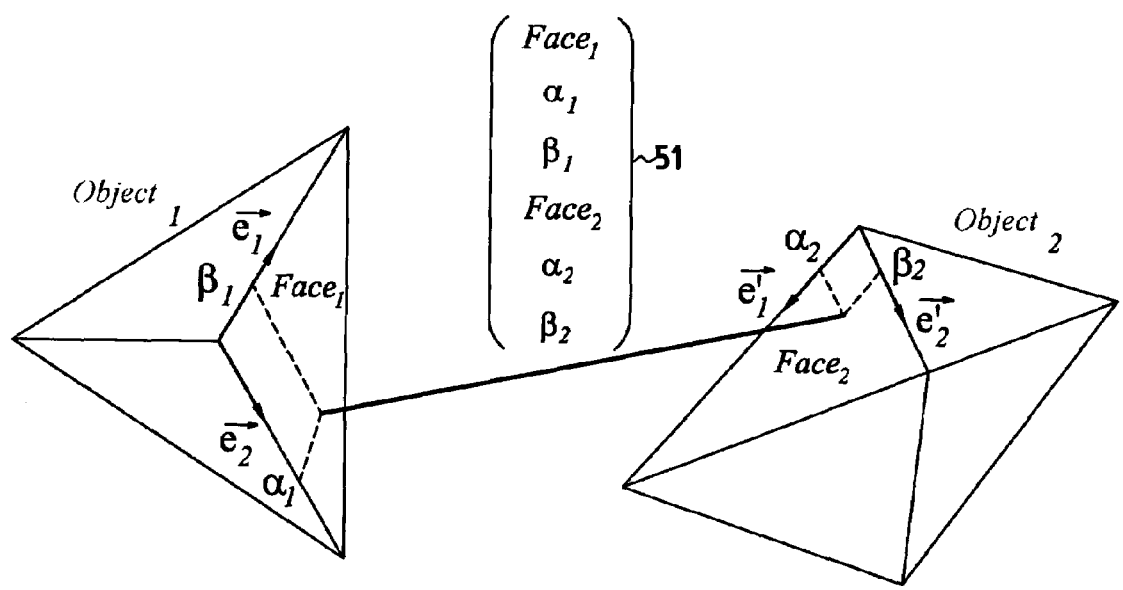
Figure 10:
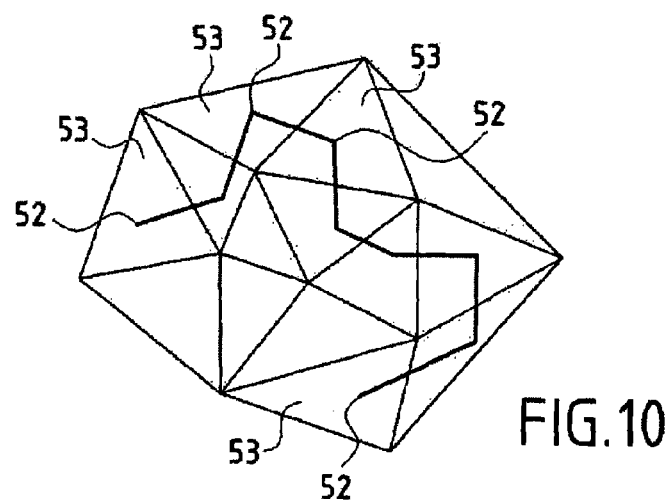
Figure 11:
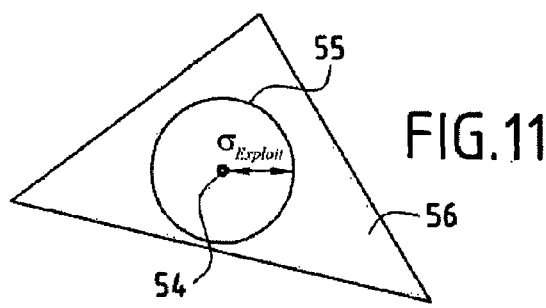
Figure 12A:
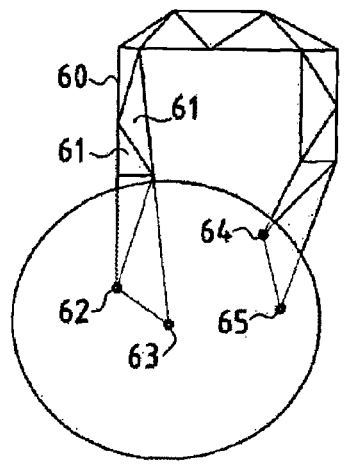
Figure 12B:
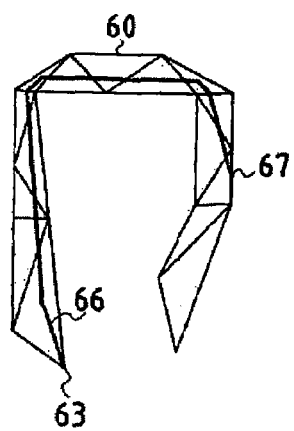
Figure 12C:
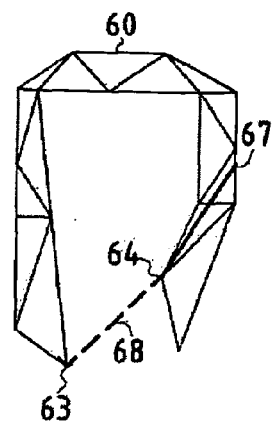
Figure 13:
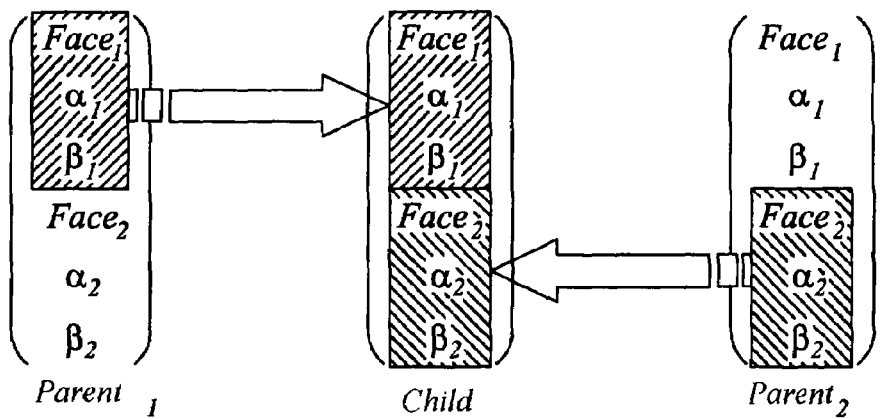
Figure 14:
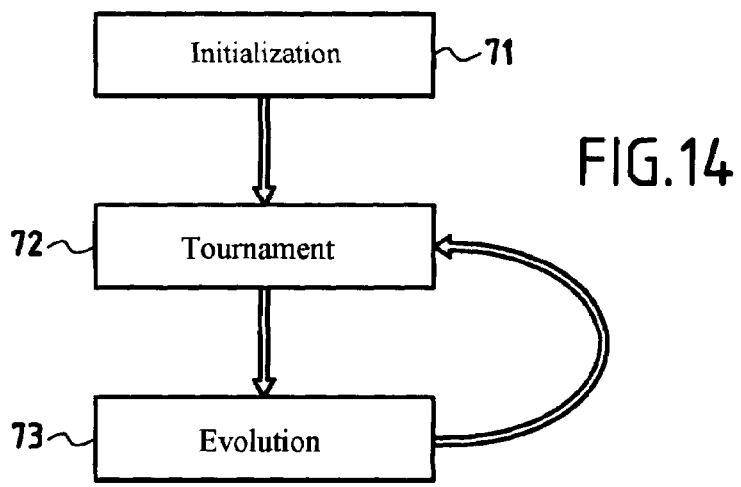
Figure 15A:
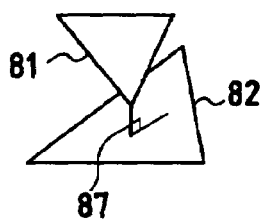
Figure 15B:
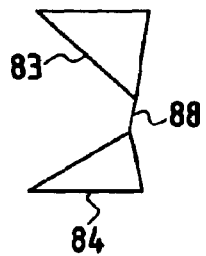
Figure 15C:
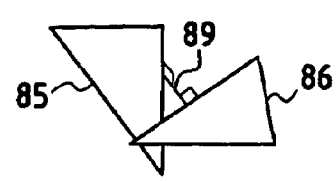
Figure 16:
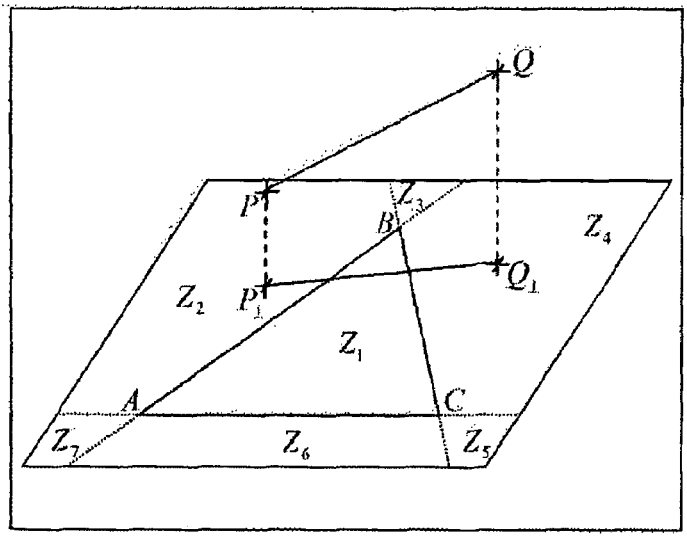
Figure 17:
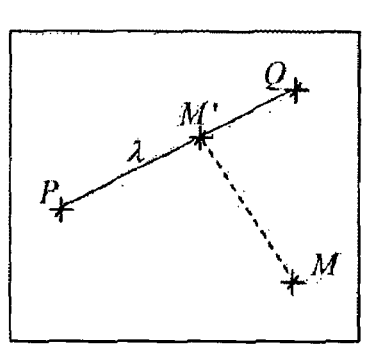
Figure 18:
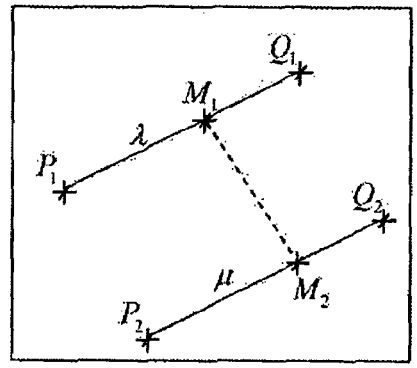
Figure 19:
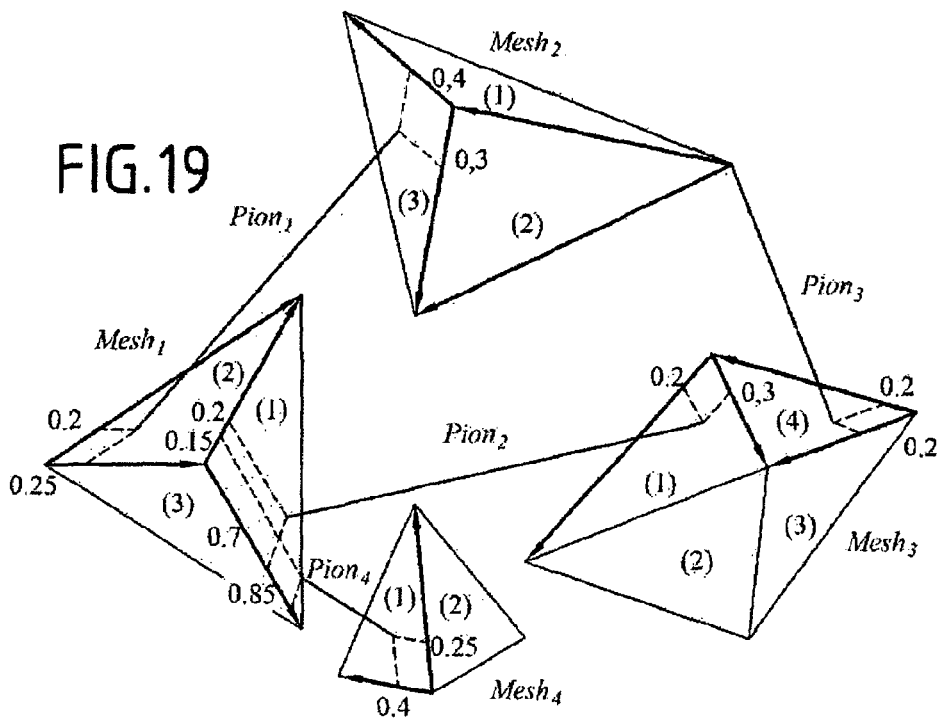
Figure 20:
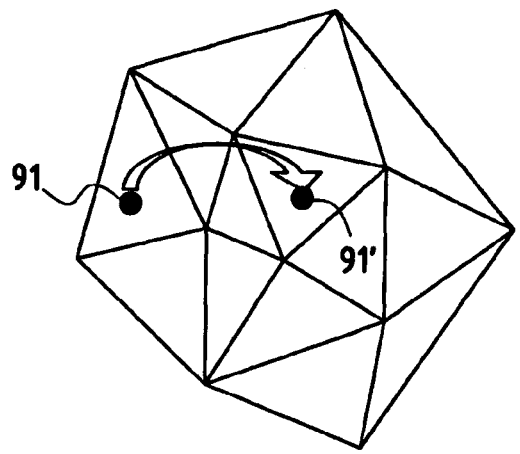
Figure 21:
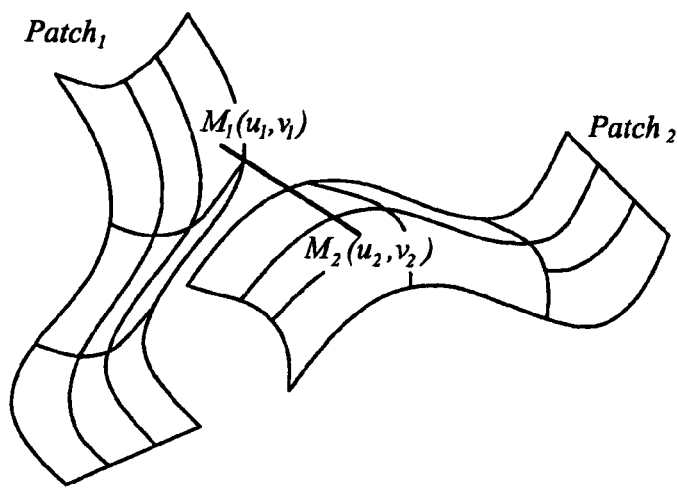
Figure 22:
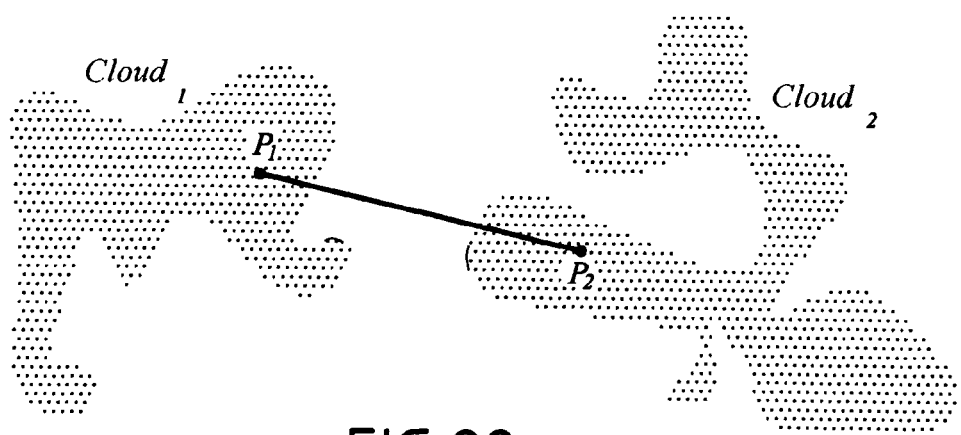
Figure 23:
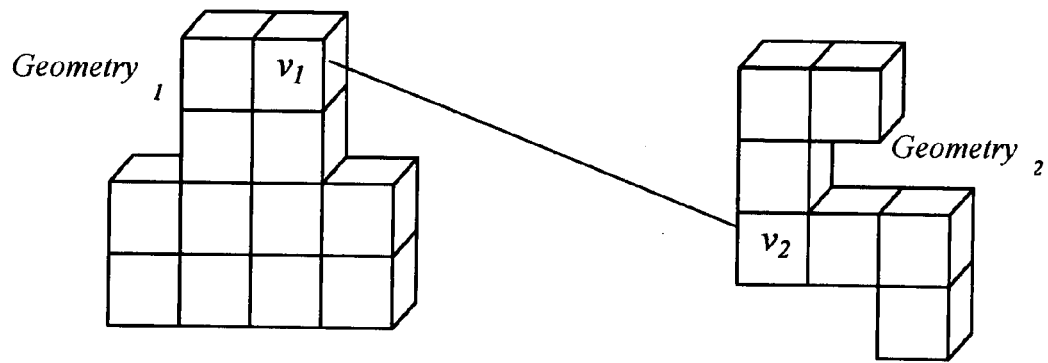
Figure 24:
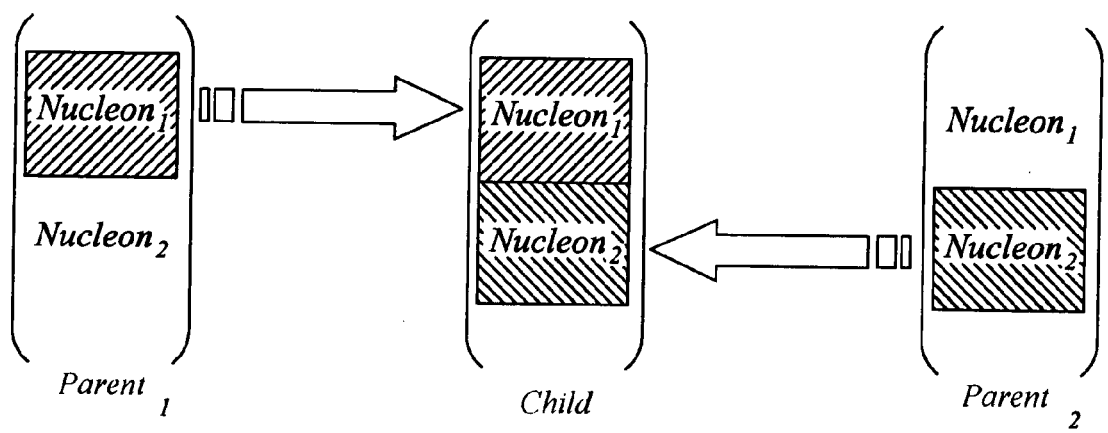
Figure 25:
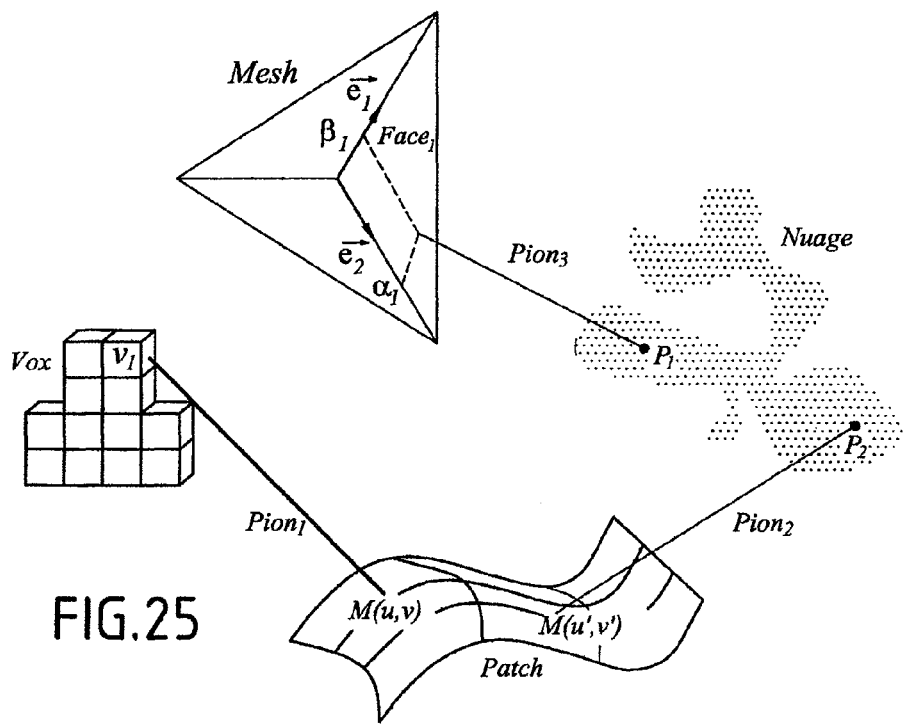
Figure 26:
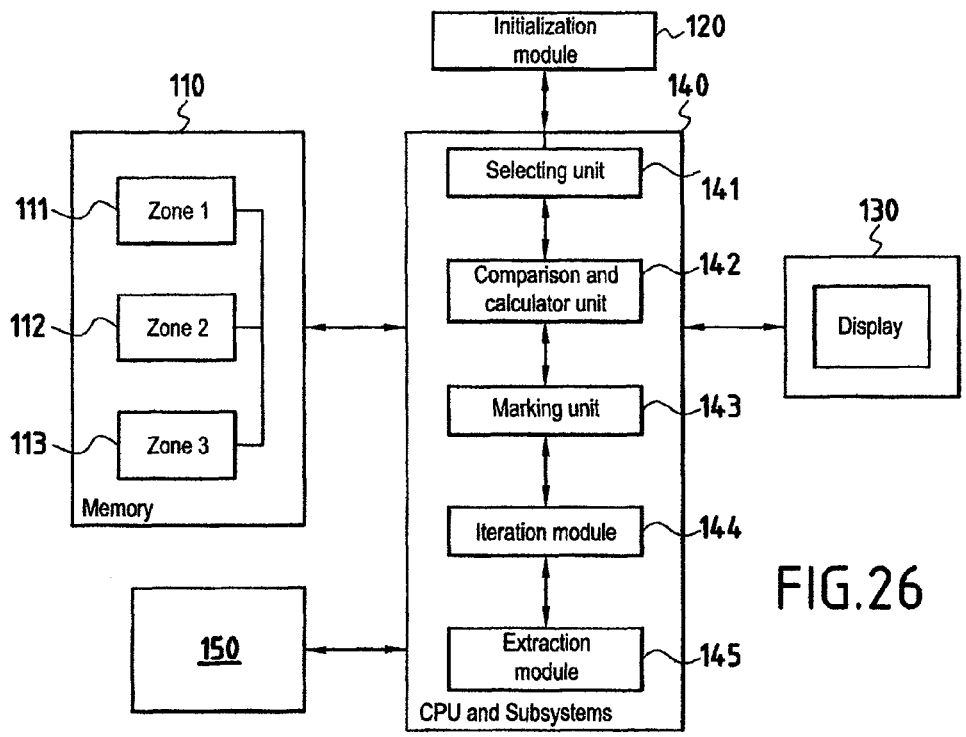

Other features and advantages of the invention emerge from the following description of particular implementations, given by way of non-limiting examples and with reference to the appended drawings, in which:

FIG. 1 is a block diagram representing the functional architecture of a virtual reality platform, FIG. 2 is a flowchart showing the dynamic evolution in accordance with the laws of physics of an object contained in the virtual world, FIG. 3 is diagram illustrating a known method of calculating the minimum distance between two objects of polyhedron type, FIGS. 4A, 4B and 4C show three examples of approximation of an object by a bounding volume, FIG. 5A shows initial and final positions of a spherical object in translation, FIG. 5B shows the swept out volume corresponding to the translation of the object from FIG. 5A, FIG. 6 shows one example of voxel decomposition of an object, FIG. 7A shows one example of hybrid representation of an object in the form of voxels cooperating with another object represented in the form of a cloud of points and normals, FIG. 7B shows in detail a zone of interaction of the two objects represented in hybrid manner in FIG. 7A, FIG. 8 shows the representation of two objects subjected to repulsion forces in accordance with the penalty method, FIG. 9 is a diagram showing the genotype of an individual or pion used in the context of the invention, FIG. 10 shows an example of discrete exploratory displacement of a point on a polyhedron in the context of a mutation, FIG. 11 shows an example of an exploitation operator involved in the context of a mutation, FIG. 12A shows a process of identification of close elements in the context of objects represented in polyhedral form, FIG. 12B shows an example of a path with no wormholes in the object represented in FIG. 12A, FIG. 12C shows an example of a path via a wormhole in the object represented in FIG. 12A, FIG. 13 represents the principle of a crossing of two pions, FIG. 14 represents the three main stages of the method according to the invention, FIG. 15A, 15B and 15C shows three examples of geometrical configurations for materializing the edge defining the minimum distance between two triangles of polyhedral representations of objects to which the two points constituting a pion belong, FIG. 16 shows the projection of ends of an edge onto a plane containing a triangle in the context of determining the edge defining the minimum distance between two triangles belonging to polyhedra representing two interacting objects, FIGS. 17 and 18 show, for the process represented in FIG. 16, the determination of an edge defining a minimum distance, respectively in the point-edge situation and in the edge-edge situation, FIG. 19 represents the genotype of several pions defined between different polyhedra representing different objects, FIG. 20 shows the random replacement of a pion for an object represented in polyhedral form, FIG. 21 shows the genotype of a pion defined between two parameterized surfaces representing two objects, FIG. 22 shows the genotype of a pion defined between two clouds of points representing two objects, FIG. 23 shows the genotype of a pion defined between two voxel representations of objects, FIG. 24 shows the function of a crossing operator, FIG. 25 represents hybrid pions defined between geometries of different types representing objects, and FIG. 26 is a block diagram showing the main modules constituting one example of a system according to the invention.

The method and the system according to the invention, which are described by means of one particular implementation thereof, start from digitally simulated objects or virtual objects and identify geometrical zones liable to collide throughout a dynamic real-time simulation using geometrical representations of the objects and independently of the geometrical complexity and the nature (convexity, rigidity) of the objects.

The method according to the invention uses an evolutionary process for this. Generally speaking, it applies a strategy that consists in having a population of individuals evolve using variation (mutation, crossing) operators adapted to cause that population to converge towards an optimum configuration.

The quality of an individual is evaluated by means of an objective ("fitness") function adapted to measure one or more qualitative criteria.

This kind of evolutionary process generating new individuals is highly efficient and simple to implement.

The method according to the invention, which applies an evolutionary process to virtual reality, is described initially with reference to objects represented by polyhedra, but the invention is of a more general nature and applies regardless of the geometrical representation of the objects concerned.

As already indicated, the basic strategy of the method according to the invention is to cause a population of individuals evolve using variation (mutation, crossing) operators adapted to cause the population (set of individuals) to converge towards an optimum configuration.

FIG. 9 shows one example of the definition of the genotype 51 of an individual (also referred to below as a "pion"), that individual being defined as a pair of nucleons consisting of points respectively belonging to each of two meshes $Object_1$ and $Object_2$ representing first and second objects whose proximity is to be evaluated.

Thus the genotype 51 of a pion may be expressed as follows:

$$\begin{bmatrix} Face_1 \\ \alpha_1 \\ \beta_1 \\ Face_2 \\ \alpha_2 \\ \beta_2 \end{bmatrix}$$

in which the indices (unsigned integers) Face represent the identifiers of the respective faces to which the points defining the pion belong, $\alpha_1$ and $\beta_1$ are the coordinates of the point belonging to the first polyhedron in the base $(\vec{e_1},\vec{e_2})$ of the face concerned, and likewise $\alpha_2$ and $\beta_2$ in the base $(\vec{e'_1},\vec{e'_2})$ ($0 \leq \alpha_i \leq 1$, $0 \leq \beta_i \leq 1$, $\alpha_i + \beta_i \leq 1$).

The genotype defined above is intended to be used in the context of simulating polyhedral type objects. It is important to emphasize that, more generically, a pion is simply defined by two nucleons belonging to two respective objects of any kind. If implicit surfaces are considered, for example, a pion will be defined by the coordinates $(x_1,y_1,z_1)$ of the first point and the coordinates $(x_2,y_2,z_2)$ of the second point. With voxel type geometries, the points could be defined by the index of the voxels concerned. Thus the description of a pion is directly linked to the type of geometry used. It is moreover possible to define a pion between two geometries of different types, the coordinates of the points being systematically expressed in the Cartesian space at the time of the evaluation.

The objective ("fitness") function or aptitude criterion for evaluating the quality of a pion consists in measured distance between the first and second nucleons defining that pion. This measurement may advantageously be the square of the distance between the two nucleons that constitute the pion.

Let $(x_1,y_1,z_1)$ and $(x_2,y_2,z_2)$ be the respective Cartesian coordinates of the nucleons constituting a pion $p_1$ projected in the same frame of reference. The expression of the fitness of this individual is as follows:

$$fitness(p_1) = (x_2-x_1)^2 + (y_2-y_1)^2 + (z_2-z_1)^2.$$

The use of the square of the norm is advantageous because the square root function is very costly in terms of computation time.

Note that the quality Quality (p) of an individual or pion p is inversely proportional to its objective (fitness) function (p).

Mutation refers to an evolution operator that may be defined as a greater or lesser variation of the genetic heritage of an individual.

More particularly, in the context of the present invention, mutating an individual consists in displacing the points that constitute it on the surface of the objects to which they belong.

Several displacement heuristics may be defined in the context of simulations using polyhedra.

Thus with the exploration operator shown by way of example in FIG. 10, the points defining the individual concerned will be able to move over great distances on the surface of the objects. This operator generates discrete displacements of centers 52 of facets 53 into centers 52 of facets 53 considering the connectedness of the objects concerned, obtained with the aid of adjacency maps of the precomputed polyhedra. The amplitude of these displacements, which corresponds to the number of hops effected during mutation, is determined at random. It is from 0 to $\sigma_{Explor}$, the maximum displacement amplitude depending on the geometry of the object.

FIG. 10 shows the discrete exploratory displacement of a point on a polyhedron with an amplitude of eight hops, but this value is naturally given by way of example only.

An exploitation operator, shown in FIG. 11, that corresponds to another type of mutation is adapted to refine the positioning of the points that constitute the individual concerned. In contrast to exploration mutation, these displacements are defined in a metric manner. Thus each point will effect a displacement on a disc of radius $\sigma_{Exploit}$, the maximum displacement amplitude, having for its center the initial position of the point. The maximum displacement amplitude (expressed in meters) may depend on the area of the face 56 on which the displacement is effected. Accordingly, this amplitude is calculated during the precomputation stage for each facet 56.

Displacement on the faces 61 of a polyhedral representation 60 of an object considering only the connectedness (adjacency properties) may prove restrictive, especially with objects that are thin or greatly curved. Thus according to another aspect of the invention, a second "map" based on the proximity of the vertices is installed. During the precomputation stage, for each vertex 62, 63 there is established a list of the closest vertices 64, 65. If one of the points (63) constituting the pion undergoing mutation is located at a vertex at the end of a displacement, there is the option (but not the obligation) for it to slip towards a close vertex (64) that is not necessarily connected. This type of displacement may be called a "wormhole", referring to Einstein-Rosen bridges (passages similar to shortcuts linking distant zones in a curved universe).

FIG. 12A shows the polyhedral representation 60 of an object having faces 61.

According to a proximity map, the vertices 64, 65 are identified as being closest to the vertices 62, 63.

FIG. 12B shows an example of a path 66 with no wormholes from the vertex 63 to a point 67.

FIG. 12C shows an alternative path using the "wormhole" mutation operator. Here, the path from the vertex 63 to the point 67 includes a passage 68 of the "wormhole" type outside the representation 60 of the object, between the vertices 63 and 64 identified as being close.

Mutation operators having functions similar to those of the three operators described above may be defined in the context of simulation using other types of geometry.

The invention also uses a variation operator, called a "crossing" operator, that is intended to accelerate the convergence of the population (FIG. 13). The principle is to generate a pion (child) by coupling two pions taken from the population (parents). The new pion therefore has genetic properties specific to its two parents. In practice, this operator may be used in the following way: the "child" pion has for nucleon 1 that of the first parent and for nucleon 2 that of the second parent.

FIG. 14 is a general diagram of the method according to the invention, including an initialization or first stage 71, a tournament or second stage 72, and an evolution or third stage 73.

During the initialization stage 71, data is provided for identifying the points describing the geometry of each of the graphically simulated objects, and this data is stored in memory.

During the same initialization stage 71, there is also created a connectivity map containing information defining topological vicinity properties within the objects and the information of this connectivity map is stored in memory.

The initialization stage 71 further comprises establishing a proximity map containing information defining the proximity (wormhole) properties within the objects and storing the information from this proximity map in memory.

There is finally created during the initialization stage 71 a population consisting of a set of N individuals (called pions), each defined by first and second nucleons consisting of points belonging to the respective geometries of two distinct objects identified beforehand.

The tournament stage 72 consists in organizing combats between individuals. A combat between two individuals or pions evaluates which of the two pions is of better quality, i.e. which of the two pions has the lower objective ("fitness") function (or aptitude criterion).

Accordingly, during the tournament stage 72, sessions are organized involving the N pions of the population created, during each of which sessions a percentage of the population is subjected to combats during which there is evaluated, for each pair of pions subjected to a combat and as a function of an evaluation of the quality defined on the basis of an aptitude criterion, which pion won and which pion lost, and the winner and the loser are identified by a mark that is different at the end of each session of the tournament.

The various sessions of the tournament stage 72 may comprise, for example, a first session Mut % consisting in combats of a percentage of the population that will thereafter generate mutations, a second session cross % consisting in combats of a percentage of the population that thereafter will generate crossings, and a third session Rand % consisting in combats of a percentage of the population that will thereafter generate random redefinitions.

The first, second, and third sessions Mut %, Cross %, and Rand % may take place in any order. After the tournament stage 72, the winning pions are identified by a mark that is different from that of the losing pions. The marking of the pions also differs as a function of the session during which they were subjected to one or more combats.

The evolution stage 73 consists in applying the variation operators defined above to the population as a function of the results of the tournament and thus comprises mutation of the pions that lost during the first session Mut % of the tournament, replacement of the pions that lost during the second session Cross % of the tournament, by crossing randomly chosen pions, and redefining the pions that lost during the third session Rand % of the tournament. The winners of the combats, which are assumed to be good components, are processed to determine zones of proximity between two objects. The process is iterative and the stages 72 and 73 may be repeated continuously. It is possible at any time to exploit an enhanced configuration by exploiting only the pions then marked as winners.

The method according to the invention is not much dependent on the geometrical nature and the quality of the objects. It is usable in the context of simulations using all types of geometry (polyhedra, voxels, parameterized surfaces, etc.), provided that adequate variation operators are defined. Moreover, it enables the mixing of geometries, the points that constitute the pions being able to evolve in an entirely different manner to the surface of the respective objects to which they belong. The method is not sensitive to concavities, exploratory mutations and random redefinitions responsible for the diversity of the population.

The quality of the objects (orientation of the normals, holes, etc.) in no way affects the functioning of the process. This is a considerable advantage (current physics engines are highly sensitive to the quality of the objects, which often has a considerable effect on their correct functioning).

The execution times of the second and third steps 72, 73 of the process (tournament, evolution) are not dependent on the number of elementary geometrical entities, but only the number of pions, which is not dependent on the geometrical complexity of the objects. In all cases, there are many fewer pions than elementary geometrical entities. The overall process is therefore relatively independent of the geometrical complexity of the objects.

As already indicated, an individual or a pion of a population of N individuals consists of two points that are also referred to as nucleons.

There has been described above, more particularly for objects represented polyhedrally, a set of evolution operators ("mutators") adapted to cause the pions to evolve within the polyhedra to which they belong.

Another operator positions the nucleons constituting the individual concerned optimally on the triangles that contain them within representations of objects of polyhedral type.

This mutation operator uses a deterministic approach to minimize exactly and locally the objective (fitness) function of the pion concerned. This mutation operator is intended to be applied to the elite of the individuals constituting the population. It is intended to accelerate convergence and to improve the accuracy of the results obtained by implementation of the method.

The objective of this operator is to position the nucleons that constitute the pion concerned to materialize the edge defining the minimum distance between the respective two triangles to which they belong.

FIGS. 15A, 15B, 15C show three different geometrical configurations with two triangles 81, 82; 83, 84 and 85, 86, respectively, for which the edges 87; 88; 89 respectively materializing the minimum distance between the two triangles corresponds to a vertex/face, vertex/vertex and edge/edge interaction.

The determination method described below can cope with these various situations.

To determine the optimum positioning of the nucleons constituting the pion concerned in a shorter time, the triangle/triangle case is divided into six edge/triangle cases as explained below, thus covering all of the geometrical configurations defined above.

$$\psi_{TT}\begin{pmatrix} (A_1, B_1, C_1), \\ (A_2, B_2, C_2) \end{pmatrix} = \min \begin{Bmatrix} \psi_{ST}([A_1, B_1](A_2, B_2, C_2)), \\ \psi_{ST}([A_1, C_1](A_2, B_2, C_2)), \\ \psi_{ST}([C_1, B_1](A_2, B_2, C_2)), \\ \psi_{ST}([A_2, B_2](A_1, B_1, C_1)), \\ \psi_{ST}([A_2, C_2](A_1, B_1, C_1)), \\ \psi_{ST}([C_2, B_2](A_1, B_1, C_1)) \end{Bmatrix}$$

In the above equation, $\psi_{ST}(S,T)$ and $\psi_{TT}(T_1,T_2)$ define the edges materializing the minimum distance in the edge/triangle case and the triangle/triangle case, respectively.

The determination of the minimum edge in the edge/triangle case is itself divided into two stages:

Identification of the possible geometrical configurations and of the components concerned (edges, points, face).

Determination of the minimum edge.

The first stage consists in projecting the ends of the edge orthogonally onto the plane containing the triangle. Combining the positions of their projections relative to the triangle will make it possible to identify the possible geometrical configurations and the components potentially concerned. The positions of the projections relative to the triangle are formalized through their belonging to one of the plane portions defined by the straight lines carrying the sides of the triangle. For example, as illustrated in FIG. 16, the projections $P_1$, $Q_1$ of the ends P and Q of the edge respectively belong to the zones $Z_2$ and $Z_4$ of the plane containing the triangle (A,B,C).

There are therefore 49 possible combinations: $\{(Z_i,Z_j), 1\leq i\leq 7, 1\leq j\leq 7\}$.

The table below gives the pairs of elements potentially carrying the minimum edge for each of the combinations in which $\psi_{ss}([P_1 Q_1], [P_2 Q_2])$ and $\psi_{ps}(M, [P Q])$ determine the edges materializing the minimum distance in the edge/edge case and the point/edge case, respectively.

| $P_\perp/Q_\perp$ | $Z_1$ | $Z_2$ | $Z_3$ | $Z_4$ |
|---|---|---|---|---|
| $Z_1$ | $[PP_\perp]$ $[QQ_\perp]$ | $[PP_\perp]$ $\psi_{SS}([PQ],[AB])$ | $[PP_\perp]$ $\psi_{SS}([PQ],[AB])$ $\psi_{SS}([PQ],[CB])$ | $[PP_\perp]$ $\psi_{SS}([PQ],[CB])$ |
| $Z_2$ | $[QQ_\perp]$ $\psi_{SS}([PQ],[AB])$ | $\psi_{SS}([PQ],[AB])$ | $\psi_{SS}([PQ],[AB])$ | $\psi_{SS}([PQ],[AB])$ $\psi_{SS}([PQ],[CB])$ |
| $Z_3$ | $[QQ_\perp]$ $\psi_{SS}([PQ],[AB])$ $\psi_{SS}([PQ],[CB])$ | $\psi_{SS}([PQ],[AB])$ | $\psi_{PS}(B,[PQ])$ | $\psi_{SS}([PQ],[CB])$ |
| $Z_4$ | $[QQ_\perp]$ $\psi_{SS}([PQ],[CB])$ | $\psi_{SS}([PQ],[AB])$ $\psi_{SS}([PQ],[CB])$ | $\psi_{SS}([PQ],[CB])$ | $\psi_{SS}([PQ],[CB])$ |
| $Z_5$ | $[QQ_\perp]$ $\psi_{SS}([PQ],[CB])$ $\psi_{SS}([PQ],[AC])$ | $\psi_{SS}([PQ],[AB])$ $\psi_{SS}([PQ],[AC])$ $\psi_{SS}([PQ],[CB])$ | $\psi_{SS}([PQ],[CB])$ | $\psi_{SS}([PQ],[CB])$ |
| $Z_6$ | $[PP_\perp]$ $\psi_{SS}([PQ],[AC])$ | $\psi_{SS}([PQ],[AB])$ $\psi_{SS}([PQ],[AC])$ | $\psi_{SS}([PQ],[AB])$ $\psi_{SS}([PQ],[AC])$ $\psi_{SS}([PQ],[CB])$ | $\psi_{SS}([PQ],[AC])$ $\psi_{SS}([PQ],[CB])$ |
| $Z_7$ | $[PP_\perp]$ $\psi_{SS}([PQ],[AB])$ $\psi_{SS}([PQ],[AC])$ | $\psi_{SS}([PQ],[AB])$ | $\psi_{SS}([PQ],[AB])$ | $\psi_{SS}([PQ],[AB])$ $\psi_{SS}([PQ],[AC])$ $\psi_{SS}([PQ],[CB])$ |

The second stage consists in determining the optimum pion. Thus all of the above-mentioned functions are defined in this part.

The point/edge case is shown in FIG. 17 and corresponds to $\psi_{PS}(M,[PQ])$.

The aim is to determine the coefficient $\lambda$ such that:

$$\left\{\lambda \in [0, 1], \forall \mu \in [0, 1] \| \overrightarrow{(\lambda \cdot \overrightarrow{PQ})M} \| < \| \overrightarrow{(\mu \cdot \overrightarrow{PQ})M} \| \right\}$$

After expressing this in equation form:

$$\overrightarrow{PM'} = \lambda \cdot \overrightarrow{PQ}$$

$$\overrightarrow{PQ} \cdot \overrightarrow{MM'} = 0$$

four equations in four unknowns are obtained:

$$\begin{cases} x_{M'} - x_P = \lambda \cdot (x_Q - x_P) \\ y_{M'} - y_P = \lambda \cdot (y_Q - y_P) \\ z_{M'} - z_P = \lambda \cdot (z_Q - z_P) \\ (x_Q - x_P) \cdot (x_{M'} - x_M) + (y_Q - y_P) \cdot (y_{M'} - y_M) + (z_Q - z_P) \cdot (z_{M'} - z_M) = 0 \end{cases}$$

from which we deduce:

$$\lambda = \frac{(x_Q - x_P) \cdot (x_P - x_M) + (y_Q - y_P) \cdot (y_P - y_M) + (z_Q - z_P) \cdot (z_P - z_M)}{(x_Q - x_P)^2 + (y_Q - y_P)^2 + (z_Q - z_P)^2}$$

In order to ensure that M' belongs to [PQ], the coefficient $\lambda$ is saturated, in other words:

If $\lambda < 0$, then $\lambda$ is given the value 0

If $\lambda > 1$, then $\lambda$ is given the value 1.

The edge/edge case is shown in FIG. 18 and corresponds to $\psi_{SS}([P_1Q_1],[P_2Q_2])$ The aim is to determine the coefficients $\lambda$ and $\mu$ such that:

$$\left\{ \begin{array}{c} \lambda \in [0, 1], \mu \in [0, 1], \forall (\alpha, \beta) \in [0, 1]^2, \\ \| \overrightarrow{(\lambda \cdot \overrightarrow{P_1Q_1})(\mu \cdot \overrightarrow{P_2Q_2})} \| < \| \overrightarrow{(\alpha \cdot \overrightarrow{P_1Q_1})(\beta \cdot \overrightarrow{P_2Q_2})} \| \end{array} \right\}$$

After expressing this in equation form:

$$\overrightarrow{P_1M_1} = \lambda \cdot \overrightarrow{P_1Q_1}$$

$$\overrightarrow{P_2M_2} = \mu \cdot \overrightarrow{P_2Q_2}$$

$$\overrightarrow{P_1Q_1} \cdot \overrightarrow{M_1M_2} = 0$$

$$\overrightarrow{P_2Q_2} \cdot \overrightarrow{M_1M_2} = 0$$

eight equations in eight unknowns are obtained:

$$\begin{cases} x_{M_1} - x_{P_1} = \lambda \cdot (x_{Q_1} - x_{P_1}) \\ y_{M_1} - y_{P_1} = \lambda \cdot (y_{Q_1} - y_{P_1}) \\ z_{M_1} - z_{P_1} = \lambda \cdot (z_{Q_1} - z_{P_1}) \\ x_{M_2} - x_{P_2} = \lambda \cdot (x_{Q_2} - x_{P_2}) \\ y_{M_2} - y_{P_2} = \lambda \cdot (y_{Q_2} - y_{P_2}) \\ z_{M_2} - z_{P_2} = \lambda \cdot (z_{Q_2} - z_{P_2}) \\ (x_{Q_1} - x_{P_1}) \cdot (x_{M_2} - x_{M_1}) + (y_{Q_1} - y_{P_1}) \cdot (y_{M_2} - y_{M_1}) + (z_{Q_1} - z_{P_1}) \cdot (z_{M_2} - z_{M_1}) = 0 \\ (x_{Q_2} - x_{P_2}) \cdot (x_{M_2} - x_{M_1}) + (y_{Q_2} - y_{P_2}) \cdot (y_{M_2} - y_{M_1}) + (z_{Q_2} - z_{P_2}) \cdot (z_{M_2} - z_{M_1}) = 0 \end{cases}$$

from which we deduce:

$$\lambda = \frac{\begin{pmatrix} x_{Q_1P_1} \cdot x_{Q_2P_2} + y_{Q_1P_1} \cdot \\ y_{Q_2P_2} + z_{Q_1P_1} \cdot z_{Q_2P_2} \end{pmatrix} \cdot \frac{\begin{pmatrix} x_{Q_2P_2} \cdot x_{P_2P_1} + y_{Q_2P_2} \cdot \\ y_{P_2P_1} + z_{Q_2P_2} \cdot z_{P_2P_1} \end{pmatrix}}{x_{Q_2P_2}^2 + y_{Q_2P_2}^2 + z_{Q_2P_2}^2} - \begin{pmatrix} x_{Q_1P_1} \cdot x_{P_2P_1} + y_{Q_1P_1} \cdot \\ y_{P_2P_1} + z_{Q_1P_1} \cdot z_{P_2P_1} \end{pmatrix}}{-x_{Q_1P_1}^2 - y_{Q_1P_1}^2 - z_{Q_1P_1}^2 + \frac{\begin{pmatrix} x_{Q_1P_1} \cdot x_{Q_2P_2} + y_{Q_1P_1} \cdot \\ y_{Q_2P_2} + z_{Q_1P_1} \cdot z_{Q_2P_2} \end{pmatrix}^2}{x_{Q_2P_2}^2 + y_{Q_2P_2}^2 + z_{Q_2P_2}^2}}$$

$$\mu = \frac{\lambda \cdot \begin{pmatrix} x_{Q_1P_1} \cdot x_{Q_2P_2} + y_{Q_1P_1} \cdot \\ y_{Q_2P_2} + z_{Q_1P_1} \cdot z_{Q_2P_2} \end{pmatrix} - \begin{pmatrix} x_{Q_2P_2} \cdot x_{P_2P_1} + y_{Q_2P_2} \cdot \\ y_{P_2P_1} + z_{Q_2P_2} \cdot z_{P_2P_1} \end{pmatrix}}{x_{Q_2P_2}^2 + y_{Q_2P_2}^2 + z_{Q_2P_2}^2}$$

To ensure that $M_1$ and $M_2$ respectively belong to $[P_1Q_1]$ and $[P_2Q_2]$, the coefficients $\lambda$ and $\mu$ are saturated as before.

For digital simulation of objects involving a plurality of objects mobile relative to one another, it is possible to create a population of pions for each pair of objects. This approach may be retained if the number n of objects is relatively small, but may prove costly in computation time if the number n of objects is very much greater than 2.

The invention can be implemented using a single population of N individuals or pions that is applied to all of the geometries representative of objects present within the simulation.

Under such circumstances, the pions of the same population can evolve, not only over one of the pairs of geometries contained in the simulation, but over all of the pairs of geometries (or meshes) contained in the simulation.

In order to give preference to the pertinent combinations, the pairs of objects that cannot come into contact are not taken into account, in particular objects that are connected rigidly or very far apart.

If the polyhedral case is considered, the genotype of a pion is expressed in the following manner, where $Mesh_1$ and $Mesh_2$ represent the identification of the meshes (polyhedra) of the objects to which the two points (nucleons) constituting a pion belong:

$$\begin{bmatrix} Mesh_1 \\ Face_1 \\ \alpha_1 \\ \beta_1 \\ Mesh_2 \\ Face_2 \\ \alpha_2 \\ \beta_2 \end{bmatrix}$$

where the indices (unsigned integers) Mesh and Face respectively represent the identifiers of the polyhedra and the faces to which the nucleons defining the pion belong, $\alpha_1$ and $\beta_1$ represent the coordinates of the point belonging to the first polyhedron in the base $(\vec{e}_1, \vec{e}_2)$ of the face concerned, and likewise for $\alpha_2$ and $\beta_2$ in the base $(\vec{e}'_1, \vec{e}'_2)$ ($0 \leq \alpha_i \leq 1, 0 \leq \beta_i \leq 1, \alpha_i + \beta_i \leq 1$).

The mutators defined above are not affected by this mode of operation. The intergeometry "hops" of the nucleons are effected during the stage of random replacement that covers all of the space to be scanned, not just one of the geometries.

The general application of the method to a population of N pions $Pion_1$ to $Pion_4$ covering n geometrical representations $Mesh_1$ to $Mesh_4$ of objects is shown in FIG. 19 for the case n=4 and N=4.

The genotypes of the four pions in the FIG. 19 example are as follows:

$$Pion_1 = \begin{pmatrix} 1 \\ 2 \\ 0.2 \\ 0.25 \\ 2 \\ 3 \\ 0.3 \\ 0.4 \end{pmatrix}$$

$$Pion_2 = \begin{pmatrix} 1 \\ 1 \\ 0.2 \\ 0.7 \\ 3 \\ 1 \\ 0.3 \\ 0.2 \end{pmatrix}$$

-continued $$Pion_3 = \begin{pmatrix} 2 \\ 2 \\ 0.0 \\ 0.0 \\ 3 \\ 4 \\ 0.2 \\ 0.2 \end{pmatrix}$$

$$Pion_4 = \begin{pmatrix} 1 \\ 1 \\ 0.15 \\ 0.85 \\ 4 \\ 1 \\ 0.25 \\ 0.4 \end{pmatrix}$$

The invention applies equally to simulations involving polyhedral geometries, which are routinely used in a great number of fields of application, such as virtual reality or infographics, and to simulations involving non-polyhedral geometries.

The genotypes and mutation operations adapted to polyhedral geometries have already been described in the examples given above.

FIG. 20 shows an example of a mutator for random replacement of a nucleon 91, 91' on the facets of a polyhedral structure.

A few examples of the use of the invention involving non-polyhedral geometries are described below.

FIG. 21 illustrates objects represented by parameterized (Bézier, B-Spline, etc.) surfaces called "patches".

With such objects, the definition of each of the nucleons of a pion includes the identifier $Patch_1$, respectively $Patch_2$ of the parameterized surface to which it belongs and the coordinates $u_1v_1$, respectively $u_2v_2$ of that nucleon within that parameterized surface $Patch_1$, respectively $Patch_2$ to which it belongs.

The genotype of a pion is then as follows:

$$\begin{bmatrix} Patch_1 \\ \mu_1 \\ \nu_1 \\ Patch_1 \\ \mu_2 \\ \nu_2 \end{bmatrix}$$

In FIG. 21, $M_1$ and $M_2$ are mathematical expressions that respectively define $Patch_1$ and $Patch_2$.

On the subject of mutators used with parameterized surfaces, note that the evolution of a nucleon on a parameterized surface consists in stochastic modification of its coordinates therein (i.e. $(u,v) \Rightarrow (u+\Delta_u, v+\Delta_v)$). Accordingly, the maximum values chosen for the variation coefficients $\Delta_u$ and $\Delta_v$ will condition the type of mutation (exploration or exploitation).

Random repositioning of a nucleon may be effected by a random change of its coordinates.

Objects represented in the form of clouds of points are illustrated in FIG. 22, in which two representations of objects are referenced $Cloud_1$ and $Cloud_2$.

Under such circumstances, to determine the genotype of a pion, each of the nucleons is defined by the identifier $p_1$, respectively $p_2$ of the point to which it belongs, as follows:

$$\begin{bmatrix} Cloud_1 \\ p_1 \\ Cloud_2 \\ p_2 \end{bmatrix}$$

On the subject of the mutation operators, the evolution of a nucleon within a cloud of points will consist in causing it to effect hops to points adjacent that to which it belongs. For this purpose, in order to limit the computation time, it is necessary to generate in a precomputation stage a proximity map similar to that used in the polyhedral case. The provision of a random replacement mutator is trivial. It simply consists in updating at random the parameter $p_1$ and $p_2$.

FIG. 23 illustrates objects represented by voxel geometries named $Geometry_1$ and $Geometry_2$.

With voxels, to define the genotype of a pion, each of the nucleons is identified by the identifier $\upsilon_1$, respectively $\upsilon_2$ of the voxel to which it belongs, as follows:

$$\begin{bmatrix} Geometry_1 \\ \upsilon_1 \\ Geometry_2 \\ \upsilon_2 \end{bmatrix}$$

The genotype as previously defined may nevertheless prove unsuitable in certain cases (voxels of different sizes or that are too large). It may then prove necessary to enrich them with the coordinates of the nucleons within their respective voxel.

With voxels, mutators may be defined as follows:

Discrete exploration: The nucleon is moved from voxel to voxel with the aid of a precomputed proximity map.

Continuous exploration: If the voxels prove to be large, the nucleon may be moved on the surface of the voxel to which it belongs (stochastic variation of its coordinates within the voxel).

Stochastic exploitation: Continuous exploration of restricted amplitude.

Deterministic exploitation: The edge "materializing" the minimum distance between two cubes is trivial to determine by deterministic means. Thus deterministic exploitation consists in locally minimizing a pion within a pair of voxels.

Random replacement: Random choice of new voxels.

It will be noted that the crossing operator defined above with reference to polyhedral geometries also proves to be perfectly adapted to all of the genotypes proposed with representations in the form of parameterized surfaces, clouds of points or voxels.

FIG. 24 represents in general the crossing operator for producing from two pions $Parent_1$ and $Parent_2$ a pion Child consisting of the first nucleon $Nucleon_1$ of the pion $Parent_1$ and the second nucleon $Nucleon_2$ of the pion $Parent_2$.

The genotypes and mutators that have just been defined take the form of formalisms adapted to the definition and evolution of nucleons within different types of chosen geometries.

It may nevertheless be noted that, in the context of using the method, evaluating the quality of a pion amounts to evaluating the Euclidean distance separating the nucleons that constitute it.

Consequently it is entirely possible for geometries of different types to be operative within the same simulation and to take into consideration hybrid pions consisting of nucleons of different kinds, as shown in FIG. 25, where, by way of example, there is seen a polyhedral representation "Mesh" of a first object, a representation "Cloud" of a second object in the form of a cloud of points, a voxel representation "Vox" of a third object, and a representation "Patch" of a fourth object in the form of a parameterized surface, with a first pion $Pion_1$ whose nucleons belong to the geometrical representations "Vox" and "Patch", a second pion $Pion_2$ whose nucleons belong to the geometrical representations "Patch" and "Cloud", and a third pion $P_3$ whose nucleons belong to the "Mesh" and "Cloud" geometrical representations, which yields the following genotypes for these three pions:

$$Pion_1 = \begin{pmatrix} Vox \\ v_1 \\ Patch \\ u \\ v \end{pmatrix}$$

$$Pion_2 = \begin{pmatrix} Patch \\ u \\ v \\ Cloud \\ p_2 \end{pmatrix}$$

$$Pion_3 = \begin{pmatrix} Mesh \\ Face_1 \\ \alpha_1 \\ \beta_1 \\ Cloud \\ p_1 \end{pmatrix}$$

FIG. 26 shows in block diagram form an example of a system in accordance with the invention for identification of zones of proximity between a number P of graphically simulated objects, where $P \geq 2$.

This system comprises a memory unit 110 with memory zones 111, 112, 113.

A first memory zone 111 stores data describing the geometry of each of the P graphically simulated objects.

A second memory zone 112 stores information representing a connectivity map and defining the adjacency properties within each of the P objects.

A third memory zone 113 stores information representing a proximity map and defining proximity properties within each of the P objects.

An initialization module 120 creates a population consisting of a set of N pions each defined by first and second points or nucleons respectively belonging to the geometries of one of the P objects and another of the P objects.

A display screen 130 displays the P digitally simulated objects, if required.

A central processing unit 140 includes the following subsystems 141 to 145:

mean 141 for selecting a percentage of the population of the N pions to be subjected to combats two by two during a session of a tournament, comparison and calculation means 142 for evaluating, during a session of a tournament, for each pair of pions subjected to a combat, the quality of each of the pions of the pair of pions, on the basis of an aptitude criterion, marking means 143 for identifying in each session of the tournament which of the pions of a pair of pions subjected to a combat has won and which of the pions of said pair of pions subjected to a combat has lost, iteration means 144 for producing an evolution of the pions that have been subjected to at least one combat, an extraction module 145 for retaining only the best pions from the population, as a function of the aptitude criterion, for the determination of the zones of proximity between at least two of the P objects.

The iteration means 144 are associated with an operator for exploratory mutation of pions that lost during a first session of the tournament, an operator for replacement of pions that lost during a second session of the tournament by crossing randomly chosen pions, and an operator for redefining pions that lost during a third session of the tournament.

The reference 150 designates an optional interface such as a haptic interface for exploiting the pions selected and retained during the repetitive execution of the tournaments and the evolutionary process.

Note that the invention avoids sorting stages, which are costly in time, and, by virtue of the independence of the processing of the individuals, enables use of a process that lends itself very well to parallelization, with the possibility of distributing the calculations over a plurality of microprocessors or microcontrollers, as well as the possibility for each nucleon of a pion of passing from one type of object geometry to another, which gives great flexibility of operation.

The populations of individuals may comprise a few hundred individuals, for example.

The invention claimed is:

1. A method of identifying zones of proximity between at least first and second digitally simulated objects, the method being characterized in that it comprises the following steps:
   a) providing data describing a geometry of each of the first and the second digitally simulated objects and storing this data in memory,
   b) creating a population consisting of a set of N individuals called pions each defined by a first and a second nucleon themselves defined as points belonging to the respective geometries of each of the first and the second objects,
   c) organizing sessions of a tournament involving the N pions of the created population, during each of which sessions a percentage of the population is subject to combats during which, for each pair of pions subjected to a combat, and as a function of an evaluation of quality defined on the basis of an aptitude criterion, it is evaluated which pion has won and which pion has lost, and the winner and the loser are identified by a mark that is different after each session of the tournament,
   d) after the tournament, performing: an exploratory mutation of pions that lost during a first session; a replacement of pions that lost during a second session, by crossing randomly chosen pions; and a random redefinition of pions that lost during a third session,
   (e) considering only a population of winners of the combats for processing the pions to be used to identify zones of proximity between the first and the second objects,
   (f) executing steps (c), (d) and (e) again repetitively, and
   (g) extracting geometrical information on demand from an updated configuration of the population of pions, during the repetitive execution.

2. A method according to claim 1, characterized in that during the step of extracting the geometrical information, distances between the identified zones of proximity are evaluated.

3. A method according to claim 1, characterized in that data for identifying zones of space describing the geometry of at least one of the first and the second digitally simulated objects comprises polyhedral representations.

4. A method according to claim 3, characterized in that data for identifying zones of space describing the geometry of at least one of the first and the second digitally simulated objects comprises voxel representations.

5. A method according to claim 1, characterized in that data for identifying zones of space describing the geometry of at least one of the first and the second digitally simulated objects comprises representations by means of parameterized surfaces.

6. A method according to claim 1, characterized in that data for identifying zones of space describing the geometry of at least one of the first and the second digitally simulated objects comprises representations by means of clouds of points.

7. A method according to claim 1, characterized in that the aptitude criterion for evaluating the quality of a pion consists in measuring a distance separating the first and the second nucleons defining that pion, the quality of the pion being inversely proportional to the measured distance.

8. A method according to claim 7, characterized in that the distance measurement constituting the aptitude criterion for evaluating the quality of a pion takes into account a square of the distance separating the first and the second nucleons defining that pion.

9. A method according to claim 1, characterized in that it further comprises, after step (a) of providing data describing the geometry of each of the first and the second digitally simulated objects, the following steps:
   (a1) creating a connectivity map containing information defining properties of adjacency between geometrical elements within the first and the second objects and storing the information of this connectivity map in memory,
   (a2) creating a proximity map containing information defining proximity properties between the first and the second objects and storing the information of this proximity map in memory.

10. A method according to claim 9, characterized in that mutating the pions that lost during a session of the tournament to generate exploratory mutations for the pions that lost consists in moving the first and the second nucleons constituting a pion on surfaces of the first and the second objects to which the first and the second nucleons respectively belong.

11. A method according to claim 10, characterized in that data for identifying zones of space describing the geometry of at least one of the first and the second digitally simulated objects comprises polyhedral representations, when mutating a pion that lost during a session of the tournament, to generate exploratory mutations for the pions that lost, at least one of the first and the second nucleons constituting that pion and belonging to one of the first and the second objects represented in polyhedral form is subjected to a succession of discrete facet center to facet center movements, considering the information defining the adjacency properties stored in memory.

12. A method according to claim 10, characterized in that data for identifying zones of space describing the geometry of at least one of the first and the second digitally simulated objects comprises polyhedral representations, when mutating a pion that won during the tournament, at least one of the first and the second nucleons constituting that pion and belonging to one of the first and the second objects represented in a polyhedral form is subjected to a movement on a same facet on a disk having for its center an initial position of that point and for its radius a maximum displacement amplitude that depends on an area of the facet on which the displacement is effected.

13. A method according to claim 10, characterized in that data for identifying zones of space describing the geometry of at least one of the first and the second digitally simulated objects comprises polyhedral representations, when mutating a pion that won during the tournament, at least one of the first and the second nucleons constituting that pion and belonging to one of the first and the second objects represented in a polyhedral form is subjected to a movement in a wormhole form from one vertex of one facet to a nearby vertex of another facet that is not necessarily connected, considering the information defining the proximity properties stored in memory.

14. A method according to claim 10, characterized in that data for identifying zones of space describing the geometry of at least one of the first and the second digitally simulated objects comprises polyhedral representations, when mutating a pion that won during the tournament, the first and the second nucleons constituting that pion and respectively belonging to the first and the second objects each represented in a polyhedral form with triangular facets are positioned so that they delimit an edge defining a minimum distance between two triangular facets to which these first and second nucleons respectively belong.

15. A method according to claim 1, characterized in that mutating the pions that lost during a session of the tournament to generate exploratory mutations for the pions that lost consists in moving the first and the second nucleons constituting a pion on the surfaces of the first and the second objects to which the first and the second nucleons respectively belong.

16. A method according to claim 1, characterized in that during a session of the tournament for generating replacements for the pions that lost, when replacing a pion that lost by crossing randomly chosen pions, so as to define a new pion resulting from crossing first and second randomly chosen pions, it is considered that the new pion consists of the first nucleon of the first randomly chosen pion and the second nucleon of the second randomly chosen pion.

17. A method according to claim 1, applied to a set of P digitally simulated objects with P≧2, the method being characterized in that it comprises the following steps:
(a) providing data describing a geometry of each of the P graphically simulated objects,
(b) creating a population consisting of a set of N individuals called pions each defined by a first and a second nucleon, themselves defined as points belonging to the respective geometries of one of the P objects and another of the P objects,
(c) organizing sessions of a tournament involving the N pions of the created population, during each of which sessions a percentage of the population is subject to combats during which, for each pair of pions subjected to a combat, and as a function of an evaluation of quality defined on the basis of an aptitude criterion, it is evaluated which pion has won and which pion has lost, and the winner and the loser are identified by a mark that is different after each session of the tournament,
(d) after the tournament, performing: an exploratory mutation of pions that lost during a first session, a replacement of pions that lost during a second session, by crossing randomly chosen pions; and a random redefinition of pions that lost during a third session,
(e) considering only a population of the winners of the combats for processing the pions to be used to identify zones of proximity between two of the P digitally simulated objects,
(f) executing steps (c), (d), and e) again repetitively, and
(g) extracting geometrical information on demand from an updated configuration of the population of pions, during the repetitive execution.

18. A method according to claim 17, characterized in that data for identifying zones of space describing the geometry of the P digital simulated objects comprise polyhedral representations and in that the method further comprises, after step (a) of providing data describing the geometry of each of the P digitally simulated objects, the following steps:
(a1) creating a connectivity map containing information defining properties of adjacency between geometrical elements within each of the P objects and storing the information of this connectivity map in memory,
(a2) creating a proximity map containing information defining proximity properties between the one of the P objects and another of the P objects and storing the information of this proximity map in memory.

19. A system for identifying zones of proximity between a number P of digitally simulated objects with P≧2, the system being characterized in that it comprises:
(a) first memory means for storing data describing the geometry of each of the P objects,
(b) an initialization module for creating a population consisting of a set of N individuals called pions each defined by first and second nucleons, themselves defined as points respectively belonging to the geometries of one of the P objects and another of the P objects,
(c) a central processor unit comprising at least:
(c1) means for selecting a percentage of the population of the N pions to be subjected to combats two by two during a session of a tournament,
(c2) comparison and calculation means for evaluating during a session of a tournament, for each pair of pions subjected to a combat, a quality of each of the pions of the pair of pions on the basis of an aptitude criterion,
(c3) marking means for identifying in each session of the tournament which of the pions of a pair of pions subjected to a combat won and which of the pions of said pair of pions subjected to a combat lost,
(c4) iteration means for producing an evolution of the pions that have been subjected to at least one combat, the iteration means being associated at least with an operator for exploratory mutation of pions that lost during a first session of the tournament, an operator for replacement of pions that lost during a second session of the tournament by crossing pions selected randomly, and an operator for redefinition of pions that lost during a third session of the tournament, and
(c5) an extraction module for retaining for identification of the zones of proximity between at least two of the P objects only best pions from the population as a function of the aptitude criterion.

20. A system according to claim 19, characterized in that it further comprises:
- (a1) second memory means for storing information representing a connectivity map and defining properties of adjacency between geometrical elements within each of the P objects,
- (a2) third memory means for storing information representing a proximity map and defining proximity properties between the one of the P objects and another of the P objects.

21. A system according to claim 20, characterized in that:
it further comprises a display screen for displaying the digitally simulated objects;
it further comprises a haptic interface; and
the central processor unit comprises a set of computation units operating in parallel.

22. A system according to claim 19, characterized in that it further comprises a display screen for displaying the digitally simulated objects.

23. A system according to claim 22, characterized in that it further comprises a haptic interface.

24. A system according to claim 19, characterized in that the central processor unit comprises a set of computation units operating in parallel.

* * * * *

UNITED STATES PATENT AND TRADEMARK OFFICE
CERTIFICATE OF CORRECTION

PATENT NO.        : 7,774,180 B2
APPLICATION NO.   : 11/658125
DATED             : August 10, 2010
INVENTOR(S)       : Lionnel Joussemet et al.

Page 1 of 1

It is certified that error appears in the above-identified patent and that said Letters Patent is hereby corrected as shown below:

In the Specifications

Column 3, line 47, "to," should read -- $t_0$, --;

Column 7, line 12, "P≧2," should read -- $P \geq 2$, --;

Column 7, line 58, "P≧2," should read -- $P \geq 2$, --;

Column 10, line 33, " $(0 \leq \alpha_i \leq 1, 0 \leq \beta_i \leq 1, \alpha_i + \beta_i \leq 1)$ " should read -- $(0 \leq \alpha_i \leq 1, 0 \leq \beta_i \leq 1, \alpha_i + \beta_i \leq 1)$ --;

Column 14, line 40, "1≦i≦7, 1≦j≦7}." should read -- $1 \leq i \leq 7, 1 \leq j \leq 7\}$. --;

Column 17, lines 26-27, " $(0 \leq \alpha_i \leq 1, 0 \leq \beta_i \leq 1, \alpha_i + \beta_i \leq 1)$ " should read -- $(0 < \alpha_i \leq 1, 0 \leq \beta_i \leq 1, \alpha_i + \beta_i < 1)$ --;

Column 20, line 51, "P≧2" should read -- $P \geq 2$ --;

In the Claims

Column 23, claim 17, line 54, "P≧2" should read -- $P \geq 2$ --; and

Column 24, claim 19, line 33, "P≧2" should read -- $P \geq 2$ --.

Signed and Sealed this
Eleventh Day of June, 2013

Teresa Stanek Rea
*Acting Director of the United States Patent and Trademark Office*